United States Patent [19]
Rawson et al.

[11] Patent Number: 6,028,867
[45] Date of Patent: *Feb. 22, 2000

[54] SYSTEM, METHOD, AND NETWORK FOR PROVIDING HIGH SPEED REMOTE ACCESS FROM ANY LOCATION CONNECTED BY A LOCAL LOOP TO A CENTRAL OFFICE

[75] Inventors: Richard Alvan Rawson, Santa Clara; John Charles Reilly, San Jose; Rangaswamy Ramachandran, Sunnyvale, all of Calif.

[73] Assignee: Covad Communications Group, Inc., Santa Clara, Calif.

[*] Notice: This patent is subject to a terminal disclaimer.

[21] Appl. No.: 09/252,354

[22] Filed: Feb. 17, 1999

[51] Int. Cl.⁷ .................................................. H04L 12/66
[52] U.S. Cl. .......................................... 370/463; 370/493
[58] Field of Search ...................................... 370/264, 420, 370/524, 463, 486, 489, 485, 493

[56] References Cited

U.S. PATENT DOCUMENTS

| | | | |
|---|---|---|---|
| 4,446,555 | 5/1984 | Devault et al. | 370/94 |
| 4,450,556 | 5/1984 | Boleda et al. | 370/58 |
| 4,607,139 | 8/1986 | Froment | 179/2 C |
| 4,611,321 | 9/1986 | Gabrielli et al. | 370/60 |
| 4,715,026 | 12/1987 | Eberspaecher | 370/1 |
| 4,748,637 | 5/1988 | Bishop et al. | 375/7 |
| 4,796,256 | 1/1989 | Opderbeck et al. | 370/110.1 |
| 4,799,217 | 1/1989 | Fang | 370/68.1 |
| 4,926,416 | 5/1990 | Weik | 370/60.1 |
| 4,985,891 | 1/1991 | Fujiwara et al. | 370/110.1 |
| 5,115,426 | 5/1992 | Spanke | 370/60 |
| 5,119,370 | 6/1992 | Terry | 370/60.1 |
| 5,144,619 | 9/1992 | Munter | 370/60.1 |
| 5,168,492 | 12/1992 | Beshai et al. | 370/60.1 |
| 5,170,272 | 12/1992 | Onno | 359/118 |
| 5,173,901 | 12/1992 | DeSomer | 370/112 |
| 5,204,857 | 4/1993 | Obara | 370/60 |
| 5,237,569 | 8/1993 | Sekihata et al. | 370/94.1 |
| 5,239,544 | 8/1993 | Balzano et al. | 370/94.2 |
| 5,241,539 | 8/1993 | Obermeier | 370/79 |
| 5,287,348 | 2/1994 | Schmidt et al. | 370/60.1 |
| 5,293,570 | 3/1994 | Schmidt et al. | 370/60.01 |
| 5,341,376 | 8/1994 | Yamashita | 370/99 |
| 5,343,467 | 8/1994 | Wohr | 370/59 |
| 5,355,362 | 10/1994 | Gorshe et al. | 370/16.1 |
| 5,359,600 | 10/1994 | Ueda et al. | 370/60.1 |
| 5,363,370 | 11/1994 | Abiven | 370/84 |
| 5,365,521 | 11/1994 | Ohnishi et al. | 370/60 |
| 5,375,118 | 12/1994 | Roa et al. | 370/60.1 |
| 5,390,184 | 2/1995 | Morris | 370/94.2 |
| 5,420,858 | 5/1995 | Marshall et al. | 370/60.1 |
| 5,428,609 | 6/1995 | Eng et al. | 370/60.1 |
| 5,436,890 | 7/1995 | Read et al. | 370/58.2 |
| 5,450,411 | 9/1995 | Heil | 370/94.2 |
| 5,457,684 | 10/1995 | Bharucha et al. | 370/60.1 |
| 5,469,495 | 11/1995 | Beveridge | 379/56.2 |
| 5,483,527 | 1/1996 | Doshi et al. | 370/60.1 |
| 5,533,018 | 7/1996 | DeJager et al. | 370/60.1 |
| 5,535,198 | 7/1996 | Baker et al. | 370/60 |
| 5,568,486 | 10/1996 | Huscroft et al. | 370/94.2 |
| 5,570,355 | 10/1996 | Dail et al. | 370/60.1 |
| 5,577,038 | 11/1996 | Miyahara | 370/60.1 |
| 5,598,413 | 1/1997 | Sansom et al. | 370/468 |
| 5,617,450 | 4/1997 | Kakuishi et al. | 375/230 |
| 5,631,953 | 5/1997 | Thomas et al. | 379/94 |

(List continued on next page.)

Primary Examiner—Chi H. Pham
Assistant Examiner—Kim T. Nguyen
Attorney, Agent, or Firm—Law Firm of Naren Thappeta

[57] ABSTRACT

A telecommunication system for providing a remote access connection having a bandwidth of 128 Kbps or 144 Kbps to any location (homes, small businesses, etc.) connected to a central office by a local loop, and higher bandwidth for some locations. The 128 Kbps or 144 Kbps is provided using ISDN Digital Subscriber Loop (IDSL) technology and higher bandwidth using other DSL technologies such as ADSL. Using shared equipment and transmission facilities, the present invention enables the high-speed remote access connections to be provided in a cost effective manner.

17 Claims, 4 Drawing Sheets

U.S. PATENT DOCUMENTS

| | | | |
|---|---|---|---|
| 5,666,366 | 9/1997 | Malek et al. | 370/505 |
| 5,682,385 | 10/1997 | Garcia et al. | 370/458 |
| 5,712,903 | 1/1998 | Bartholomew et al. | 379/89 |
| 5,715,309 | 2/1998 | Bartkowiak | 379/390 |
| 5,717,762 | 2/1998 | Aihara et al. | 380/49 |
| 5,719,870 | 2/1998 | Baker et al. | 370/463 |
| 5,737,320 | 4/1998 | Madonna | 370/258 |
| 5,737,333 | 4/1998 | Civanlar et al. | 370/352 |
| 5,757,803 | 5/1998 | Russell et al. | 370/494 |
| 5,764,637 | 6/1998 | Nishihara | 370/397 |
| 5,771,236 | 6/1998 | Sansom et al. | 370/458 |
| 5,790,550 | 8/1998 | Peeters et al. | 370/480 |
| 5,802,283 | 9/1998 | Grady et al. | 395/200.12 |
| 5,815,505 | 9/1998 | Mills | 370/522 |
| 5,831,979 | 11/1998 | Byers | 370/360 |
| 5,848,150 | 12/1998 | Bingel | 379/399 |
| 5,859,904 | 1/1999 | Huanh | 379/219 |
| 5,878,047 | 3/1999 | Ganek et al. | 370/486 |

SYSTEM, METHOD, AND NETWORK FOR PROVIDING HIGH SPEED REMOTE ACCESS FROM ANY LOCATION CONNECTED BY A LOCAL LOOP TO A CENTRAL OFFICE

BACKGROUND OF THE INVENTION

1. Field of the Invention

The present invention relates to telecommunication networks, and more specifically to a system, method, and network for providing high speed remote access from any location connected by a local loop to a central office.

2. Related Art

Remote access generally refers to the ability of a user to access a remote system using a local system (e.g., a personal computer). The remote system can be either a stand-alone system or a network of systems. Mainframe computers such as those available from International Business Machines is an example of a stand-alone system. A network connecting several systems such as printers, modems, servers, computer systems, telecommunication equipment, among others, is an example of a network of systems. Remote access is commonly referred to as internet access when a local system accesses a remote network of systems such as what it known as world-wide-web.

Remote access typically requires transferring digital data between a local system and a remote system. Several applications and/or services with varying degrees of complexity can be provided using the remote access feature. Electronic mail, web browsing, distributed database applications, and electronic commerce are examples of such applications and services.

There has been an increasing demand for higher bandwidth connections from locations such as homes and small businesses. The need for higher bandwidth from homes has been driven in some instances by tele-commuters (employees working from homes) who would like to enjoy similar response times from corporate computer resources as their in-office counterparts when transferring files, accessing data bases etc.

In addition, it is believed that the availability of higher bandwidth will drive the market to provide more multimedia applications over the remote access connections. Large bandwidth connections may allow small businesses to disseminate (e.g., by providing a web server locally) or receive more information quickly from external customers or companies.

One solution for providing high-bandwidth connections to homes and small business is to install fibre to every location of interest. Unfortunately, installation of fibre to every home and small business is expensive and time consuming, thereby making it unsuitable for immediate deployment.

Another solution which has been attempted is to provide high bandwidth connections over cable installed for broadcasting television programs. The physical media (cable) is shared by many users from different homes and businesses. Unfortunately, such sharing may lead to unpredictability in the bandwidth available to individual users because high usage by some users may leave very little bandwidth for the others. In addition, due to the shared nature of the underlying media, users may be concerned about security and privacy.

Yet another option is to use the physical connections already installed for providing voice telephone calls over the past several decades. Voice telephone calls have been typically provided over metallic (e.g., copper) pairs connecting to homes (and small businesses). These physical connections are commonly referred to as local loops. The local loops originate at what is known as a "central office" in the United States Telecommunications industry.

Remote access using local loops overcomes at least the disadvantages noted with reference to fibre and cable. That is, local loops have been already installed over the past several decades and they can be used immediately. In addition, each local loop is dedicated to a home or business, leading to less unpredictability in the bandwidth availability due to active use by other users.

The local loops have bee installed originally to provide connections to voice calls placed from telephone instruments in locations such as homes and offices. To provide connections for voice calls, the local loops terminating at central offices are usually connected to a voice switch (e.g., 5ESS from Lucent Technologies, 600 Mountain Avenue, Murray Hill, N.J. 07974, USA, URL:www.lucent.com, Phone Number:1-908-582-8500). A sequence of voice switches in tandem provides the basic connection for a voice call, with the last voice switch in the sequence being connected to the target (destination) telephone instrument. In general, voices switches are expensive due to the requirement to provide different types of services (e.g., switched voice calls, 9-1-1 emergency calls etc.).

Attempts have been made in the industry to provide as high bandwidth as, possible for remote access using the basic telecommunication infrastructure installed for voice calls. In a typical configuration, a home computer uses a modem to communicate with a remote system. The modem converts digital data to be transmitted from the home computer into analog signals suitable for transmission over a local loop. A remote computer uses another modem to receive the analog signals and converts back the received analog signals into digital data using another modem. The data transfer occurs in the reverse direction (i.e., from remote computer to home computer) also to support the remote access.

Unfortunately, the bandwidth rates which can be supported on local loops used as switched voice lines (i.e., using modems) is limited. Modems and remote access equipment supporting bandwidth as high as 56 Kbps (at least in one direction) have been available from companies such as 3COM corporation and Ascend Communications. Much higher bandwidth is believed to be hard to achieve on a single local loop, at least in a cost-effective manner through switched voice switches.

Bandwidth of the order of 56 Kbps may not be sufficient for some users at homes and for many small businesses. The remote access requirements for homes and small businesses typically include availability of reasonably high speed remote access at a fairly low price for affordability. Users from these types of locations usually do not have the resources to invest in special equipment (e.g., a fibre line and associated equipment) for high bandwidth. Therefore, it may be an important requirement to provide high bandwidth over the local loops described briefly above.

To provide higher bandwidth to locations connected by local loops, a group of technologies commonly referred to as digital-subscriber-loop (DSL) technologies have evolved. The DSL technologies only as applicable to the present invention are described here. For a detailed description of the various DSL technologies, the reader is referred to "Residential Broadband", by George Abe, published by Cisco Press, ISBN:1-57870-020-5, which is incorporated in its entirety herewith.

According to the DSL group of technologies, a local loop is generally dedicated for use with DSL technologies. Bandwidth higher than that possible through modem based service can be provided using these group of technologies. The bandwidth which can be provided is typically limited by the distance, the media used to implement the physical connection, potential presence of factors causing noise, and the signaling scheme chosen for the corresponding DSL technologies.

Of the DSL group of technologies, IDSL (DSL technology using basic ISDN signaling framework) can be used to provide bandwidth of 128 Kbps or 144 Kbps depending on the type of IDSL implementation. All local loops to homes can be equipped to support the IDSL signaling scheme irrespective of the distance a home is from the central office. Therefore, every location connected with a local loop can usually be provided remote access with a bandwidth of 128 Kbps or 144 Kbps. However, 128 Kbps or 144 Kbps bandwidth may not be sufficient for many locations. For example, some users at homes or small businesses may need much more than the 128 Kbps or 144 Kbps bandwidth possible using IDSL technology.

Asymmetric DSL (ADSL) is another one of the DSL group of technologies, which allows such higher bandwidth connections. As an illustration, DMT-modulated ADSL technology can support bandwidth of 6.1 Mbps in the direction leaving the central office and 640 Kbps in the reverse direction. ADSL has the general requirements that a location connected with a local loop needs to be within 14,000 feet (approximately 3 miles) of the central office and that the local loop be a continuous metallic path (without electronic transmission equipment) end-to-end (i.e., from home to central office) to a location.

Unfortunately, not all the locations (homes and businesses) meet both the requirements for ADSL. Some homes and businesses may be outside of the 3 mile range from a central office. In some other situations, the underlying local loop may not have a metallic path end-to-end. For example, the metallic wires terminating at locations such as office buildings and apartment complexes ("multiple family dwellings") typically originate at a multiplexor commonly known as digital loop carrier (DLC), and DLCs are connected to central offices through shared media as described briefly below with reference to an apartment complex including several apartments.

In a typical scenario, a DLC is placed within or close to an apartment complex. The DLC is usually connected to the central office using fibre or two pairs of metallic wires. A, bandwidth of at least T1 is generally provided between the DLC and the central office, and the data required to support connections to each telephone instrument in an apartment is multiplexed on the provided bandwidth. In some scenarios, ADSL cannot be supported due to the limited bandwidth (e.g., T1) available between DLCs and central offices. Even with the availability of substantial higher bandwidth between a central office and DLC, special hardware and/or software may be required in the DLC. Such special hardware and/or software may not be available in many DLCs. Accordingly, it may not be possible to provide ADSL based connections to several apartments.

At least from the above, it should be appreciated that high bandwidth connections may be provided using the DSL technologies. A provider may provide high bandwidth connections using either the IDSL technology alone or ADSL technology alone. The provision of high speed connection using only one of these technologies leads to several disadvantages. Some example disadvantages are noted below.

When the bandwidth is provided using only one of the DSL technologies, a service provider may not have the ability to provide high speed remote access to all locations connected to a central office by local loops. For example, a provider using only the ADSL technology may not be able to serve locations connected through DLCs and locations away from central offices by more tan three miles due to reasons described above. On the other hand, a provider using only the IDSL technology may not be able to serve subscribers requiring bandwidtl larger than 144 Kbps or 128 Kbps. As a result, the pool of potential subscribers is smaller than all the locations connected to a central office with local loops.

The smaller pool of potential subscribers in turn can lead to more disadvantages. For example, many large companies may be discouraged from subscribing to the service due to the unavailability of high speed remote access to all their employees. As a result, some large companies may not even subscribe to the service providers providing high speed remote access using only either ADSL or IDSL technology. Subscription by less companies generally leads to an even smaller pool of actual subscribers.

The cost of providing services is higher in such instances as 'economies of scale' may not be recognized due to the smaller pool of subscribers. Economy of scale refers to the generally understood notion in the telecommunications industry that the average cost to provide a given service to a large pool of consumers is less than the average cost to provide the same service to a smaller pool of consumers. The increased cost due to the small pool of actual subscribers may be unacceptable in some situations.

Therefore, what is needed is a cost-effective scheme to provide high speed remote access to any location connected to a central office.

SUMMARY OF THE INVENTION

The present invention enables high speed remote access to be provided to any location connected to a central office in a cost effective manner. Connections with a bandwidth of 128 Kbps or 144 Kbps can be provided to any location connected to a central office by a local loop. Connections with bandwidth much higher than 128 Kbps or 144 Kbps can optionally be provided to some of the locations. Connections with such high bandwidth are provided using shared equipment and transmission facilities, thereby enabling all the connections to be provided in a cost-effective manner.

A telecommunication network is employed to provide high speed remote access in accordance with the present invention. The telecommunication network includes access multiplexors and data switches. The access multiplexors are located in a central office and provide interfaces for local loops connected using IDSL technology and another DSL signaling technology. The DSL signaling technology provides the 128 Kbps or 144 Kbps bandwidth. As the local loops to any location can be used with IDSL signaling, 128 Kbps or 144 Kbps bandwidth can be provided to any location. The another DSL (e.g., ADSL) technology can provide for much higher speed transfers.

In one embodiment, an access multiplexor having some modules for interfacing with local loops using ADSL technology and other modules for interfacing with local loops using IDSL technology is employed. The access multiplexor receives packets on ADSL local loops as cells and IDSL local loops as frames. The multiplexor forwards the received data to the data switches.

The data switches deliver the data of the packets to a destination remote target. The destination remote target is typically determined based on the address contents of the packets. The data switch may perform any conversions necessary (e.g., from cells to frames and vice versa) so that the data can be delivered using a shared communication bandwidth pipe. That is, the data in all packets can be delivered to a destination remote target using one shared pipe so that economies of scale can be realized. Data is transmitted in the reverse direction from the remote targets to the locations, enabling remote access connections to be established.

Therefore, the present invention enables high speed remote access connections to be provided in a cost effective manner. This is accomplished by providing interfaces using different DSL technologies supporting high bandwidth datapaths and delivering all data received on more than one DSL interfaces to a destination remote target using a shared bandwidth pipe.

The present invention enables employees to telecommute by providing connections having a minimum bandwidth of 128 Kbps or 144 Kbps to all homes.

The present invention enables a bandwidth of 128 Kbps or 144 Kbps to be supported on the interface to any location connected to a central office. In addition, some of the locations can be provided even higher bandwidth. This is enabled by using IDSL technology in combination with other DSL technologies providing higher bandwidth.

The present invention can be used by any type of provider to provide high bandwidth remote access. That is, RBOCs such as Pac Bell and South Western Bell, Competitive Local Exchange Carriers such as Covad Communications, among other types of providers can use the present invention to provide high speed remote access. This is because the equipment required in accordance with the present invention can be conveniently placed in different locations allowed by law under the present United States regulatory environment.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

0. Definitions and Glossary of Terms

The following are the definitions of some of the terms used in the present patent application.

Location: Entities such as homes and businesses connected to a central office by a local loop.

Central office: In the U. S. Telecommunication industry, a central office commonly refers to a place where local loops connecting to different locations originate.

Local loop: Physical connection providing connectivity to a central office from a location. Each local loop typically includes a metallic (e.g., copper) wire pair connecting to a location. The physical connection to a central office may include equipment such as repeaters and/or a digital loop carrier (DLC) in the connection path.

Target: A place where remote systems are placed and accessed by users at locations using telecommunication network and local loops.

IDSL Technology: One of the DSL technologies well known in the industry, typically implemented using ISDN signaling scheme. Present (as of May 1998) implementations of IDSL technology typically provide bandwidth of 128 Kbps or 144 Kbps depending on the type of implementation.

Shared bandwidth pipes: A bandwidth pipe which allows bandwidth to be shared for transmission of data from (or to) more than one location. Shared bandwidth pipes can be used internal to telecommunication network, and also to connect telecommunication network to targets.

Telecommunication network: Includes equipment to provide interfaces (IDSL and at least one another DSL technology) to local loops and switches the data bits between remote systems and locations (or computer systems at locations).

Access Multiplexor: A multiplexor interfacing with local loops to receive (and send) data from a location. Access multiplexor is referred to as DSL access multiplexor (DSLAM) when interfacing with lines using DSL technology.

Data Switch: Equipment which receives packets on one port and routes data onto another port, typically using the address information in the packets.

Packet: A sequence of bits identifiable as a group according to a pre-determined convention.

1. Overview and Discussion of the Present Invention

Figure 1:
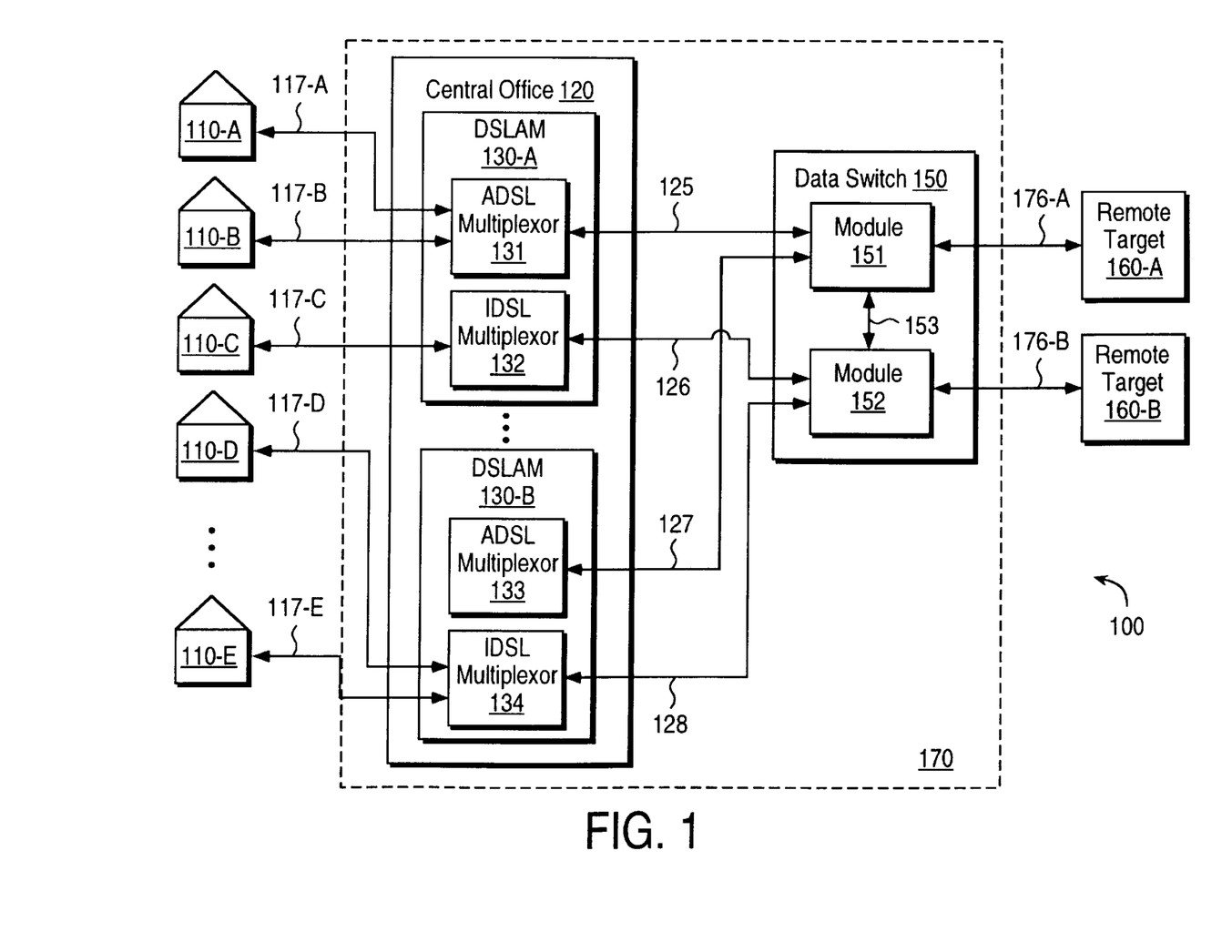
FIG. 1 is a block diagram of a telecommunications system illustrating the manner in which high speed remote access can be provided to any location connected to a central office in accordance with the present invention.

The present invention is described with general reference to telecommunications system 100 of FIG. 1. Telecommunications system 100 includes several locations 110-A through 110-E connected to access targets 160-A and 160-B by telecommunication network 170. Locations 110-A through 110-E are connected to telecommunication network 170 by local loops 117-A through 117-E respectively. Remote target 160-A is connected to telecommunication network 170 by line 176-A and remote target 160-B is connected to telecommunication network 170 by line 176-B.

In the description herein, locations 110-A through 110-E will be collectively or individually referred to by reference numeral 110 as will be clear from the context. Similarly, access targets 160-A and 160-B will collectively or individually be referred to by reference numeral 160, local loops 117-A through 117-E will be collectively or individually referred to by reference numeral 117, and lines 176-A and 176-B will be collectively or individually referred to by reference numeral 176.

Users at locations 110 need high bandwidth connections to targets 160. For example, users at locations 110-A, 110-B and 110-D may be employees at a company corresponding to target 160-A, and users at locations 110-C and 110-B may be subscribers of an internet service provider (ISP) corresponding to target 60-B. Therefore, users at locations 110-A, 110-B and 110-D may need a high bandwidth connection to target 160-A and users at locations 110-C and 110-E may need a high bandwidth connection to target 160-B.

Telecommunication network 170 provides a minimum bandwidth of 128 Kbps or 144 Kbps to any location 110. The minimum bandwidth is provided by using ISDN digital-subscriber-loop (IDSL) technology. As should be appreciated, various types of IDSL can be deployed to provide the corresponding minimum bandwidth so long as the operation of CPE 117-A is compatible with telecommunication system 170. Some example types of implementation of IDSL technology are noted in a book entitled, "The ISDN Subscriber Loop", by Nick Burd, ISBN Number 0-412-49730-1, which is incorporated in its entirety herewith. Even though the term IDSL is not used, IDSL is described in general in Chapter 4 of that book.

In addition, telecommunication network 170 provides interfaces to meet higher bandwidth requirements which may not be supported by IDSL. For example, higher bandwidth can be provided using other DSL technologies such as high bit rate DSL (HDSL), asymmetric DSL (ADSL), and single pair HDSL (SDSL). For conciseness and clarity, the description is continued assuming only ADSL and IDSL technologies are supported in telecommunication network 170. However, it should be understood that telecommumncation network 170 can be extended to support other DSL technologies to provide higher bandwidth (more than 144 Kbps) than supported by IDSL.

As telecommunication network 170 uses IDSL technology, a minimum bandwidth of 128 Kbps or 144 Kbps can be provided to any location 110 in accordance with the present invention. As noted in the section entitled "Backgound of the Invention" above, every local loop is or can be typically equipped to support the signaling for IDSL technology. Accordingly, telecommunication network 170 can provide a bandwidth of 128 Kbps or 144 Kbps to any of the locations 110. In addition, as telecommunication network 170 provides interfaces for local loops with other DSL technologies (e.g., ADSL), remote access connections at much higher speeds can be supported.

As the 128 Kbps or 144 Kbps is substantially more bandwidth than, for example, the 56 Kbps available using modems, remote targets such as companies and ISPs may embrace the technology/service provided in accordance with the present invention. The provision of other DSL technologies in combination, provides additional options and incentive for the remote targets to use the services. For example, high bandwidth available from ADSL may lure more locations or targets. As a result, the number of actual users (or subscribers to the service) may also be more.

In addition, telecommunication network 170 uses shared equipment and facilities for transmitting the data bits received from any location 110. Accordingly, economies of scale can be realized in providing high bandwidth remote access to several locations. Due to economies of scale, the average cost to provide the remote access service may be affordable.

The structure, implementation and operation of telecommunication network 170 which provides several features (including those noted above) is described below. For conciseness, the operation of telecommunication network 170 is described with reference to data transfer from locations 110 to remote targets 160-A and 160-B. However, it should be understood that the data is transferred from remote targets 160-A and 160-B to locations 110 as will be apparent to one skilled in the relevant arts.

2. Telecommunication Network

Continuing with reference to FIG. 1, telecommunication network 170 includes several interfaces to communicate with locations 110. The interfaces are provided at central office 120. Central office 120 includes DSL access multiplexors (DSLAMs) 130-A and 130-B, each with several ports for receiving local loops 117. Each of DSL access multiplexors (DSLAMs) 130-A and 130-B (collectively or individually referred by 130) is connected to data switch 150. Data switch 150 is connected to remote targets 160-A and 160-B.

In operation, DSLAMs receive packets from IDSL local loops and at least one another DSL (e.g., ADSL) local loops on the respective interfaces. DSLAMs forward the received packets to data switch 150 preferably using shared bandwidth pipes on lines 125–128. Data switch 150 delivers each received packet to the appropriate remote target 160-A or 160-B also preferably using shared bandwidth pipes on lines 176-A and 176-B. It should be clear that data transfer occurs in the reverse direction from remote targets locations via data switch 150 and DSLAMs 130. Therefore, telecommunication network 170 provides remote access connections between locations 110 and remote targets 160-A and 160-B.

As is well known in the art the bandwidth on each remote access connection is limited by the least bandwidth available in a communication path. The minimum bandwidth available to any location to DSLAM 130-A is 128 Kbps or 144 Kbps as any local loop 117 supports IDSL signaling. High bandwidth lines (e.g., T1, T3 etc.) can be employed for lines 125–128 and 176-A and 176-B. By employing high bandwidth lines and controlling the number of ports served by access multiplexors, bandwidth of 128 Kbps or 144 Kbps can be guaranteed with a statistical probability or a mathematical certainty as would be apparent to one skilled in the relevant arts. Therefore, a minimum bandwidth of 128 Kbps or 144 Kbps can be provided to any remote access connection using telecommunication network 170.

Thus, telecommunication network 170 provides end-to-end connections having a bandwidth of at least 128 Kbps or 144 Kbps. By using DSL technologies such as ADSL in combination, higher bandwidth can be optionally provided when so permitted by the technologies. By using the same transmission media and equipment to deliver packets received using both ADSL and IDSL, the overall cost to implement telecommunication network 170 can be decreased.

The implementation of telecommunication network 170 and the provision of high bandwidth remote access depends on available products, standards, legal regulations, and technologies, among others. In one embodiment described below, CPEs (described below) at locations 110 communicating by ADSL signaling are implemented using Diamond Lane H100SE (made by FlowPoint) product available from Diamond Lane Communications, 1310 Redwood Way, Suite #C, Petaluma, Calif. 94954. CPEs (described below) at locations 110 communicating by DSL are implemented using Ascend Pipeline 50 product available from Ascend Communications, Inc., 1701 Harbor Bay Parkway, Alameda, Calif. 94502-3002. Multiplexors interfacing with ADSL local loops are implemented using Diamond Lane Speedlink (™) Multiplexor available from Diamond Lane Communications. Multiplexors interfacing with IDSL local loops are implemented using Cisco 90i D4 Channel Unit available from Cisco Systems, Inc., 170 West Tasman Drive, San Jose, Calif. 95134-1706, and 16i/23 ISDN transport system from Pulse Communications, Inc, 2900 Towerview Road, Herndon. Data switch 150 is implemented using Cisco AXIS Edge Concentrator and Cisco BPX ATM switch available from Cisco Systems, Inc. The high bandwidth links (125–128, 176-A and 176-B) are purchased from companies such as Pac Bell, MFS communications, and Brooks Fiber in California.

The operation of the above-noted embodiment can be better appreciated with an understanding of the manner in which locations 110 and remote targets 160-A and 160-B communicate with telecommunication network 170, and the manner in which the packets transferred can be used by example end-systems. Therefore, a typical configuration in location 110 and remote target 160-A are described first. Further description of telecommunication network 170 is continued later.

3. Example Configurations at Locations and Remote Targets

Figure 2:
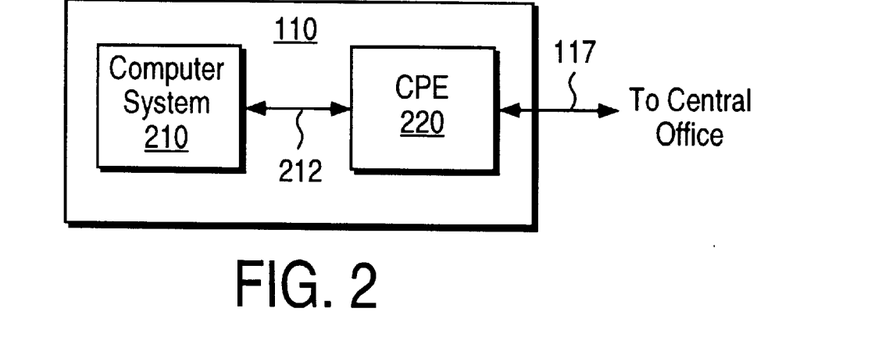
FIG. 2 is a block diagram illustrating an example configuration at a home or a small business accessing a remote target using the high speed remote access provided in accordance with the present invention.

FIG. 2 is a diagram illustrating a typical configuration in location 110-A, which enables a user to access remote target 160-A. Location 110 of FIG. 2 includes a computer system 210 connected to CPE 220 using a local connection 212. Computer system 210 communicates with CPE 220 using higher layer protocols such as IPX protocol from Novell, Inc., and Internet Protocol (IP). If more computers are to be connected at location 110, a network (such as Ethernet) can be used for local connection 212.

CPE 220 receives a sequence of bits as a data packet from computer system 210. In case local loop 117 is to be used with IDSL technology, CPE 220 transmits the sequence of bits as a frame in a known way. In case local loop 117 is to be used with ADSL technology, CPE 220 breaks each data packet into one or more cells in a known way. The cells or frames (packets) are transferred on local loop 117. The manner in which the transmitted bits in the packets are used at a remote target is described with reference to FIG. 3.

The details of ATM and Frame Relay as related to the present invention will be described here. For a detailed understanding of ATM, the reader is referred to a book entitled, "ATM: Theory and Application", (ISBN: 0070603626, Published September 1994 by McGraw-Hill Series on Computer Communications), by David E. McDysan and Darren L. Spohn, which is incorporated in its entirety herewith. For a detailed understanding of Frame Relay, the reader is referred to "Frame Relay Principles and Application", by Philip Smith, ISBN Number: 0-201-62400-1, published by Addison-Wesley Publishing Company, which is incorporated in its entirety herewith.

Figure 3:
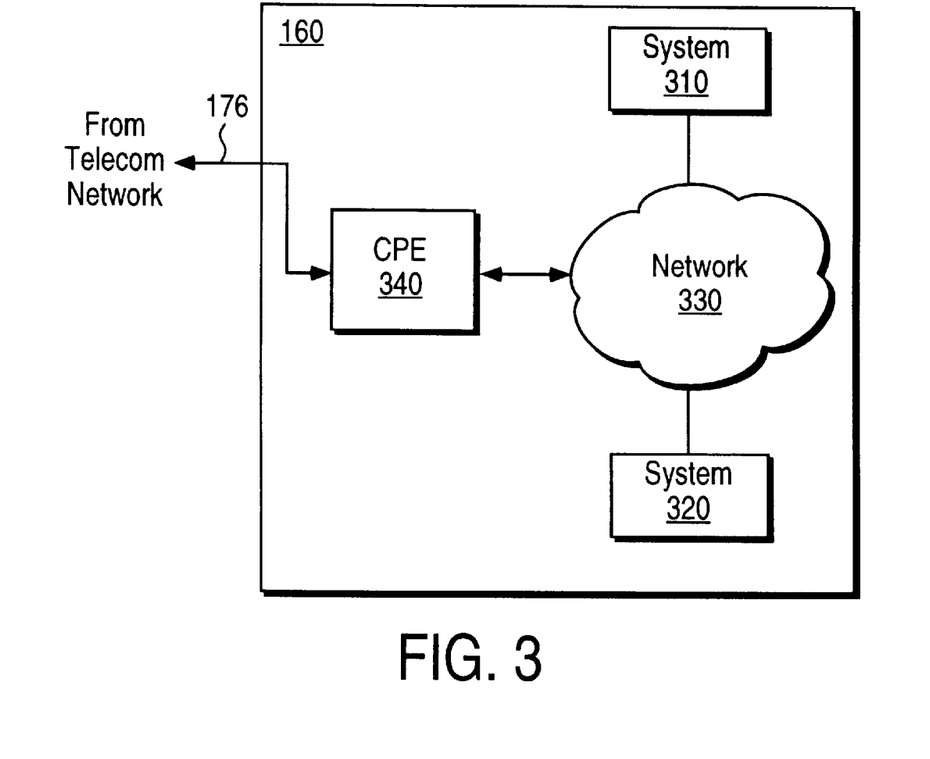
FIG. 3 is a block diagram illustrating an example configuration at a remote target accessed by locations connected to a central office in accordance with the present invention.

FIG. 3 is a diagram illustrating a typical configuration at remote target 160. Remote target 160 may correspond to a large corporation allowing employees to work from their homes (locations 110). Systems 310,320 are connected to enterprise network 330, which is connected to CPE 340. CPE 340 needs to be compatible with the manner in which data is transmitted by telecommunication network 170. As described below, telecommunication network 170 can deliver the data using either frame relay technology or ATM technology irrespective of whether location 110 transmits data bits as cells or frames. CPE 340 needs to have a compatible interface to receive the data bits. A permanent virtual connection (PVC) is configured for each location 110.

CPE 340 interprets the contents of the packets usually according to any higher level protocols (such as IP and IPX) and delivers the sequence of bits in the packets to the target end system specified with the sequence of bits. In an embodiment, CPE 340 reassembles the received frames and cells into data packets suitable for transmission on enterprise network 330.

Packets can be transferred from remote target 160 to location 110 in a similar way as described above. Thus, using the two way communication, remote access connections can be established. The details of telecommunication network 170, which enable the transfer of data from locations 110 to remote targets 160 are described in further detail below.

4. Further Details of Telecommunication network 170

As noted above, locations 110 can send (or receive) data bits either as frames or cells. However, it is desirable that all data destined for a remote target be combined for transmission on one bandwidth pipe for transmission efficiency, and the resulting lower costs. In addition, it is desirable that the data be delivered to a remote target according to a protocol (frame relay or cell relay) of choice. Accordingly, telecommunication network 170 provides such a capability as described below. In addition, telecommunication network 170 needs to provides an interface for IDSL lines and other DSL lines to provide the advantages of the present invention.

Continuing the description with reference to FIG. 1, access multiplexor 130-A includes ADSL multiplexor 131 with ports for interfacing with ADSL local loops and DSL multiplexor 132 for interfacing with IDSL lines. For conciseness, the details of only multiplexor 130-A are shown and described. However, the description is applicable to other multiplexor 130-B.

To interface the local loops with other DSL technologies, the corresponding module may need to be implemented in access multiplexors 130. Even though ports for IDSL and ADSL lines are shown on different modules, it should be understood that ports of different DSL technologies can be available in the same module (different cards or same card) depending on the DSL technologies desired to be supported by telecommunication network 170 and the available products. Similarly, products supporting more than one DSL technologies on the same ports may also be used if the products are available.

Besides the signaling aspect (ADSL, DSL), access multiplexors need to operate with ATM and frame relay aspects if CPEs use ATM and frame-relay as described with reference to FIGS. 2 and 3. In an embodiment, access multiplexor 130-A includes different modules for interfacing with ADSL and IDSL local loops. ADSL multiplexor 131 receives bits on ADSL local loops 117-A and 117-B and forwards the cell data to data switch 150 on line 125. Similarly, IDSL multiplexor 132 forwards the received frames to switch 150 on line 126. However, it should be understood that lines 125 and 126 can be combined into a single line if an access multiplexor can perform the necessary conversion of cell data into frames or frame data into cells.

IDSL multiplexor 131 and ADSL multiplexor 132 are described as using different lines to data switch 150 as the packets received by the two units are in different format (cell and frame). However, if the formats are the same (e.g., either cell or frame) or if the conversion can be performed within a DSLAM, a shared communication bandwidth pipe can be used for all packets irrespective of whether they are received using IDSL technology or any other DSL technologies. The operation and implementation of ADSL multiplexor 133 and IDSL multiplexor 134 is described similarly.

In addition, as the IDSL packets aggregated from several locations are delivered on one shared bandwidth pipe and the ADSL packets aggregated from several other locations are delivered on another bandwidth pipe, data switch 150 also may need two separate and different interfaces. One interfaces receives the ADSL packets (cells) and the other interface receives the IDSL packets (frames).

Multiplexors 131–134 are typically configured by a service provider when adding a location. The configuration could further specify the eventual destination for the received cell or frame data. Usually, telecommunication system 170 is configured to provide a permanent virtual connection (PVC) to transfer data between location 110 and a corresponding remote target 160. An individual PVC transfers data over line 117 in the format (cell or frame) appropriate to that line and transfers data over line 176 in the format (cell or frame) appropriate to that line, converting between cell and frame formats whenever necessary.

Data switch 150 (or cell/frame switch) receives packets (cell data and frame data in the described embodiment) from DSL access multiplexors 130 and delivers the data to the desired target 160-A or 160-B. Data switch 150 may need to convert packets into a desired format suitable for delivering data to targets 160-A and 160-B.

In an embodiment shown in FIG. 1, data switch 150 is implemented as two modules 151 and 152, with module 151 being implemented as a Cisco BPX ATM switch and module 152 being implemented as a Cisco Axis Edge Concentrator. In this embodiment, module 151 performs the switching function and module 152 converts cell data to frame data and frame data to cell data. For illustration, it is assumed that target 160-A is designed to receive data using ATM protocol and target 160-B is designed to receive data using frame relay. Any cells received on lines 125 and 127 and destined to remote target 160-A are forwarded on line 176-A to target 160-A by cell module 151. Any cells received on lines 125 and 127 and destined to remote target 160-B are forwarded on line 153 to module 152. Module 152 converts the cell data into frames and forwards the frames to remote target 160-B.

As to frame processing, any frames received on lines 126 and 128 and destined for remote target 160-A are first converted by module 152 from frames into cells and than forwarded to module 151. Module 151 forwards the cells to remote target 160-A. Any frames received on lines 126 and 128 and destined for 160 B are converted to cell format by module 152 and forwarded on line 153 to module 151. Module 151 forwards the cells back to module 152 on line 153. Module 152 converts the cell data back to frames and forwards them to remote target 160 B.

Thus, cell data received on line 117-A can be delivered in the forms of cells to remote target 160-A on line 176-A at least using the embodiment described above. Frames received on lines 117-E can be converted to cells and delivered on the same bandwidth pipe 176-A. Cells received on line 117-B can be converted to frames and delivered to remote target 176-B on the same bandwidth pipe 176-B along with frames received from line 117-D.

Telecommunimcation network 170 may be designed to deliver the sequence of bits without the ATM/Cell conversions if the remote target is equipped to receive the sequence of bits in the same form (frame or cells) in which the bits were sent. In such a scenario, the remote target requires separate bandwidth pipes for receiving (and sending) cells and frames.

Data switch 150 can be placed either in a central office or in an external office. In United States regulatory environment, the RBOCs (e.g., Pac Bell in California) are the general owners of central offices. However, according to the telecommunications act of 1996, RBOCs are required to provide access to unbundled local loops to parties such as competitive local exchange carriers (CLECs). As a result, only RBOCs (or incumbent local exchange carriers, ILECs) may have the option to place data switches in the central office. CLECs may need to place data switches in an external location ("regional distribution center" RDC).

Even though data switch 150 and DSLAMs 130 are described with distinct functions, it should be understood some of the functions can be implemented on one instead of the other. For example, the packet format conversions (i.e., cell-to-frame and vice-versa in the embodiments here) may be accomplished within DSLAM 130 depending on the available products. In addition, data switch 150 and DSLAM 130 may be implemented in a single unit if such a product is available in the market place.

The implementation of connections between data switch 150 and DSLAM 130, and between data switch 150 and remote target 160 can depend on the distance. Companies other than RBOCs may need to implement point-to-point links as shown in FIG. 1 for lower cost, and such links can be ordered from Pac Bell, MFS communications, and Brooks Fiber in California. Using any of such connections, high speed remote access can be provided by telecommunication network 170.

Figure 4:
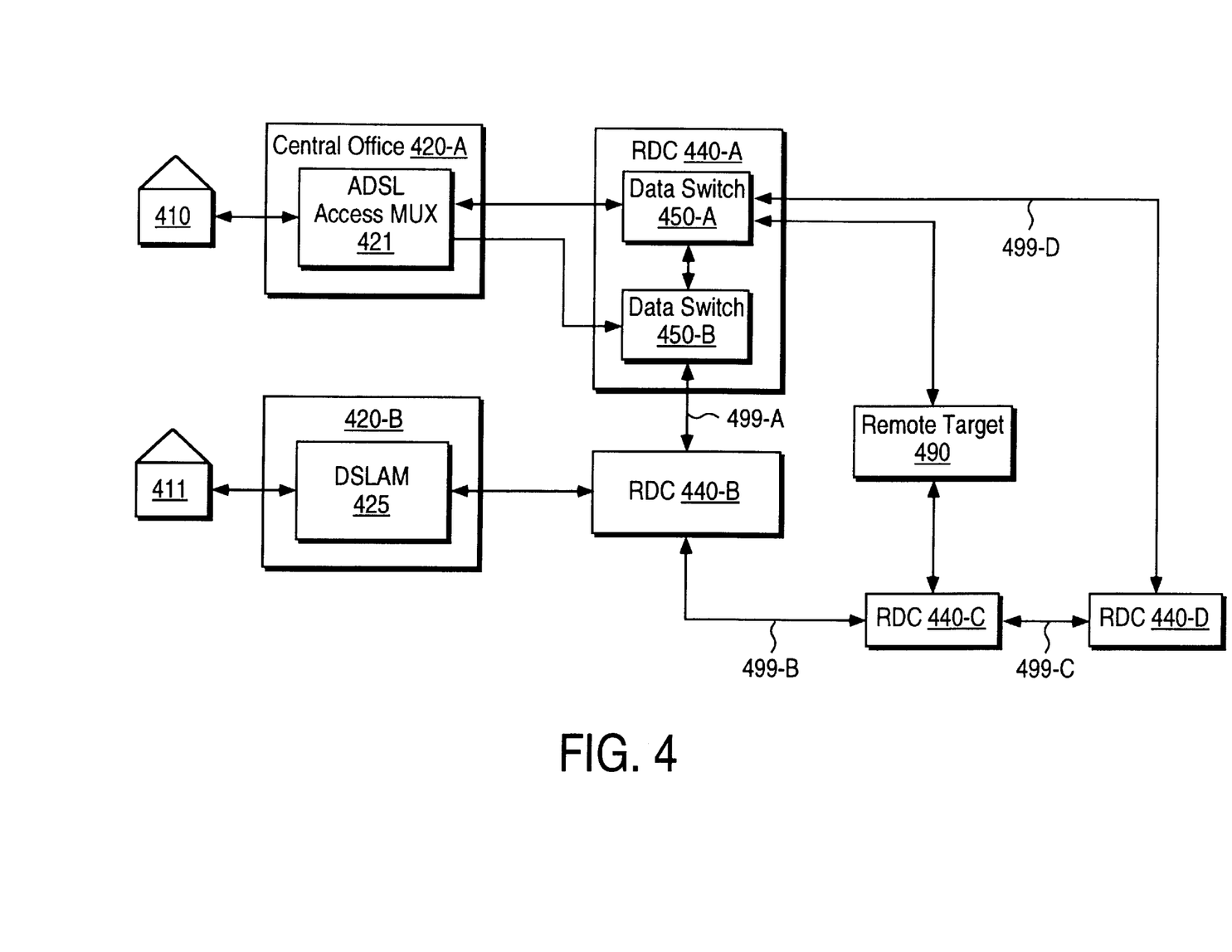
FIG. 4 is a block diagram illustrating the manner in which a telecommunications system can scale to serve large areas in accordance with the present invention.

For conciseness and clarity, a few instances of each block are shown in FIG. 1. As telecommunications system 100 expands, it can have at least several hundreds of remote targets. The large number of remote targets may need to be served from several regional distribution centers. Each distribution center can be connected to several central offices, and each central office can serve several thousands of DSL lines. Accordingly, several access multiplexors may be placed in each central office as shown in FIG. 1. FIG. 4 illustrates some general concepts underlying the extension of telecommunication system to a large area.

5. Extending the Telecommunications System to Cover a Large Area

FIG. 4 is a block diagram illustrating the manner in which telecommunication system 100 can serve a large area The Figure further illustrates how redundancy can be provided from a location to a remote target from DSLAM onwards. FIG. 4 includes two locations 410 and 411 connected to access multiplexors 421 and 425 respectively. Each block of FIG. 4 corresponds to a block with the same name in FIG. 1. For example, DSLAM 425 corresponds to DSLAM 130-A. For conciseness, the blocks of FIG. 4 are not described except for the differences.

Assuming there are a lot of locations 410 connected to ADSL multiplexor 420 and interested in accessing remote target 490, it may be desirable to provide redundancy for reliability. Therefore, ADSL multiplexor 420 is shown connected to two data switches 450-A and 450-B, both located in a nearby regional distribution center (RDC) 440-A. Regional centers 440-A, 440-B, 440-C and 440-D are connected to each other as shown in FIG. 4 by high speed links.

The connections between the regional centers allow a location connected to one RDC to access any remote target connected to any RDC. Thus, location 411 can connect to remote target 490 via a path including RDC 440-B, lines 499-A, data switch 450-B, and data switch 450-A. There are other paths for location 411 to access remote target 490 due to the redundancy of connections between the data centers. Similarly, location 410 can access remote target 490 using several paths. Location 410 has the additional security in that ADSL multiplexor 421 is connected to RDC 440-A by two links. Thus, the present invention can be used to provide high speed remote access while providing redundancy at least in some components.

At least using the embodiments described above, high speed remote access connections can be provided as a service. Such service can be provided by RBOCs such as Pac Bell, Competitive Local Exchange Carriers (CLECs) such as Covad Communications Group (the assignee of the present application), and many others. The manner in which the service can be provided is described with reference to the flow chart of FIG. 5.

Figure 5:
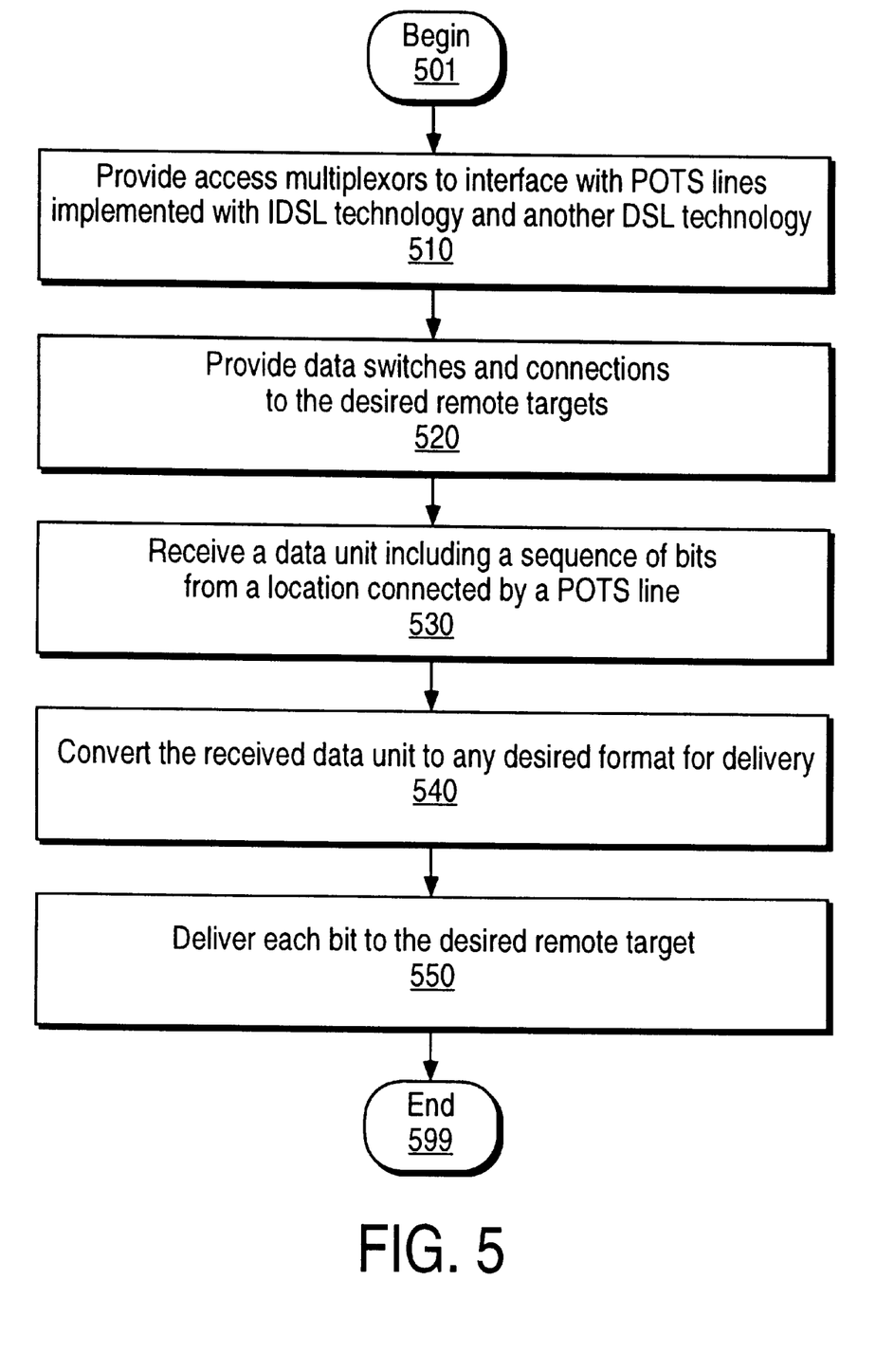
FIG. 5 is a flow chart illustrating a method for providing high speed remote access according to the present invention.

6. Method of Providing High Speed Remote Access According to the Present Invention FIG. 5 is a flow-chart illustrating the manner in which high speed remote access can be provided as a service. In accordance with the present invention, at least 128 Kbps or 144 Kbps bandwidth can be provided to any location connected to a central office by the local loops, and higher bandwidth can be optionally provided to any location. As noted above, the 128 Kbps or 144 Kbps bandwidth can be provided as every location is equipped to interface using DSL technology, and higher bandwidth can be provided to locations which interface using ADSL technology. FIG. 5 will be described with reference to FIG. 1 for clarity.

In step 510, a provider installs one or more DSL access multiplexors (DSLAMs) 130 in central office 120. The DSL access multiplexors 130 need to interface with local loops using IDSL signaling technology and another DSL signaling technology. The another DSL signaling technology (e.g., ADSL) enables the provision of bandwidth links at bandwidth higher than those provided by IDSL technology. In step 520, data switches are installed with the necessary connections to DSLAMs and remote targets.

In step 530, packets are received either using the IDSL interfaces or the ADSL interfaces. In step 540, any necessary conversions (frames to cells and vice versa) can be performed, for example, as described above.

In step 550, each bit is delivered to the desired remote target from the data switch. The desired target is usually determined by examining the contents of the received packet. In case of ATM technology, the VCI/VPI data enables such a determination and in case of frame relay technology the DLCI information allows the determination. A provider (or manager of telecommunication network 170) may need to provide the necessary configurations in the home CPEs and telecommunication network 170 for a proper operation.

In the above description of FIGS. 1–5, even though the data-flow is described in the direction of locations 110 to remote targets 160-A and 160-B, it should be understood data is transferred in the reverse direction (i.e., from remote targets 160-A and 160-B to locations 110) to support high-speed remote access in accordance with the present invention.

Thus, the present invention enables a provider to provide high speed remote access to locations connected to a central office. The provider can be a RBOC such as Pac Bell or South Western Bell, a competitive local exchange carier such as Covad Communications Group (the assignee of the subject application), or a long distance company such as AT&T, among others.

Once provided, the remote access connections can be used for other applications as well. As the connections are provided over leased lines, data can be transmitted any time of the day and applications such as those using push technology can be implemented to use the connections. Also, even though locations 110 of FIG. 1 are described as accessing the remote targets, it should be understood that a location itself may be a remote target.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A telecommunication network for providing high speed remote access from a plurality of locations to a plurality of remote targets, wherein each of said plurality of locations is connected to a central office by a local loop, said telecommunication network comprising:

an access multiplexor having a plurality of ISDN digital subscriber loop (IDSL) interfaces for interfacing with any of said local loops using an IDSL technology, said IDSL technology enabling connections with a high bandwidth to all of said plurality of locations, wherein said high bandwidth is greater than the bandwidth enabled by modems using switched voice lines, said access multiplexor having a plurality of another interfaces for interfacing with at least some of said local loops using another DSL technology, wherein said another DSL technology supports a bandwidth greater than said high bandwidth to only some of said plurality of locations, said plurality of IDSL interfaces and said plurality of another interfaces being designed to receive a plurality of packets from said plurality of locations on said plurality of local loops, each of said plurality of packets being destined to one of said plurality of remote targets; and a data switch coupled to said one of said plurality of remote targets by a bandwidth pipe, said data switch receiving data bits in said plurality of packets from said access multiplexor and delivering the data bits in said plurality of packets to said one of said plurality of remote targets using said bandwidth pipe irrespective of whether each of said plurality of packets is received on said IDSL interface or said another interface, wherein said plurality of IDSL interfaces allows said telecommunication network to provide connections of said high bandwidth to any of said plurality of locations, and said plurality of another interfaces enables said telecommunication network to provide higher bandwidth to said some of said plurality of locations.

2. The telecommunication network of claim 1, wherein said another DSL technology comprises Asymmetric DSL (ADSL) technology, and each of said another interfaces comprises an ADSL interface.

3. The telecommunication network of claim 2, wherein each of said IDSL interfaces receive said plurality of packets as a plurality of frames, and wherein each of said ADSL interfaces receive said plurality of packets as a plurality of cells.

4. The telecommunication network of claim 3, further comprising two bandwidth pipes connecting said data switch and said access multiplexor, wherein one of said two bandwidth pipes is used to transfer packets received on said ADSL interfaces and the other bandwidth pipe is used to transfer packets received on said IDSL interfaces.

5. The telecommunication network of claim 3, wherein said data switch is designed to convert said plurality of cells into new frames and said plurality of frames into new cells, wherein the conversion allows said data switch to deliver all data destined for said one of said plurality of remote targets using said shared bandwidth pipe irrespective of whether each of said packets is received on said ADSL interfaces or said IDSL interfaces.

6. The telecommunication network of claim 1, wherein said telecommunication network further comprises a plurality of multiplexors, a plurality of data switches, and a plurality of access multiplexors to supports a large geographical area and large number of locations.

7. The telecommunication network of claim 1, wherein said access multiplexor is located within said central office and said data switch is located outside of said central office.

8. The telecommunication network of claim 1, wherein said local loops are dedicated for remote access.

9. The telecommunication network of claim 1, wherein said access multiplexor and said data switch are designed to transfer data from said plurality of remote targets to said plurality of locations.

10. A method of providing high speed remote access from a plurality of locations to a plurality of remote targets, wherein each of said plurality of locations is connected to a central office by a local loop, said method comprising the steps of:

(a) locating an access multiplexor in a central office, wherein said access multiplexor includes a plurality of ISDN digital subscriber loop (IDSL) interfaces for interfacing with any of said local loops using an IDSL technology, said IDSL technology enabling connections with a high bandwidth to all of said plurality of locations, wherein said high bandwidth is greater than the bandwidth enabled by modems using switched voice lines, said access multiplexor having a plurality of another interfaces for interfacing with at least some of said local loops using another DSL technology, wherein said another DSL technology supports a bandwidth greater than said high bandwidth;

(b) receiving a plurality of packets from said plurality of locations on said plurality of local loops, each of said plurality of packets being destined to one of said plurality of remote targets;

(c) providing a data switch to receive said plurality of packets from said access multiplexor;

(d) transferring said plurality of packets to said data switch;

(e) delivering each data bit in said plurality of packets to said one of said plurality of remote targets using a shared bandwidth pipe irrespective of whether any of said plurality of packets is received using IDSL technology or said another DSL technology, wherein said plurality of IDSL interfaces allows said method to provide said high bandwidth to any of said plurality of locations, and said plurality of another interfaces enables said method to optionally provide higher bandwidth to some locations.

11. The method of claim 10, wherein said another DSL technology comprises Asymmetric DSL (ADSL) technology, and each of said another interface comprises an ADSL interface, and wherein step (b) comprises the steps of:

(f) receiving some of said plurality of packets as a plurality of cells on said ADSL interfaces; and (g) receiving some other of said plurality of packets as a plurality of frames on said IDSL interfaces wherein each of said IDSL interfaces receive said plurality of packets as a plurality of frames.

12. The method of claim 11, wherein steps (c) and (d) comprise the steps of:

providing two bandwidth pipes connecting said data switch and said access multiplexor, transferring packets received on said ADSL interfaces on one of said two bandwidth pipes; and transferring packets received on said IDSL interfaces using the other bandwidth pipe.

13. The method of claim 11, further comprising the step of converting said plurality of cells into new frames and said plurality of frames into now cells, wherein the conversion allows said data switch to deliver all data destined for said one of said plurality of remote targets using said shared bandwidth pipe irrespective of whether each of said packets is received on said ADSL interfaces or said IDSL interfaces.

14. The method of claim 10, further comprising the step of transferring data from said plurality of remote targets to said plurality of plurality locations to provide said high speed remote access.

15. The method of claim 10, further comprising the step of dedicating said local loops for remote access.

16. The telecommunication network of claim 1, wherein said access multiplexor and said data switch are provided as a single unit.

17. The telecommunication network of claim 15, wherein said high bandwidth equals 128 Kbps or 144 Kbps depending on the implementation of IDSL.

* * * * *

UNITED STATES PATENT AND TRADEMARK OFFICE
CERTIFICATE OF CORRECTION

PATENT NO. : 6,028,867
DATED : 2/22/2000
INVENTOR(S) : Rawson, et al

It is certified that error appears in the above-identified patent and that said Letters Patent is hereby corrected as shown below:

On the Title Page, insert the following after the line reading "[22] Filed: Feb 17, 1999":

Related U.S. Application Data
Item [ 63 ] Continuation of Serial Number 09/098,020, Filed: June 15, 1998, now abandoned.

At the end of page 2, add the following:
Document dated 12/1996 and Entitled, "ASCEND ANNOUNCES MULTIDSL™ STRATEGY AND FIRST COMPLETE LINE OF DSL PRODUCTS", By Ascend, Inc., 1701 Harbor Bar Parkway, Alameda, CA 94502 (Pages 1 - 4);
Document dated 12/1996 and Entitled, "REDEFINING INTERNET ACCESS: A WorldCom, Inc. White Paper", By UUNET, 3060 Williams Drive, Fairfax, VA 22031-4648, USA (Pages 1 - 7); and
Document dated 10/1997 and Entitled, "ASCEND INTRODUCES NEW CARRIER-CLASS xDSL CONCENTRATOR AND MULTI-PORT SDSL CUSTOMER PREMISE ROUTER", By Ascend, Inc., 1701 Harbor Bar Parkway, Alameda, CA 94502 (Pages 1 - 3).

Signed and Sealed this

Twenty-seventh Day of February, 2001

Attest:

NICHOLAS P. GODICI

*Attesting Officer*   Acting Director of the United States Patent and Trademark Office